United States Patent [19]

Christensen

[11] 4,443,914

[45] Apr. 24, 1984

[54] DEVICE FOR TIGHTENING A ROPE, PREFERABLY AN ELECTRIC WIRE

[76] Inventor: Jan Christensen, Haugveien 10A, N-1838 Flateby, Norway

[21] Appl. No.: 360,384

[22] Filed: Mar. 22, 1982

[30] Foreign Application Priority Data

Mar. 25, 1981 [NO] Norway ................................. 811018

[51] Int. Cl.³ ............................................. F16G 11/03
[52] U.S. Cl. .................................. 24/115 R; 24/115 G
[58] Field of Search ............ 24/700 T, 115 G, 129 A, 24/136 R, 134 L, 115 G; 248/74 R, 74 A, 73; 174/40 CC, 79 R, 40 TD; 254/201, 246, 247, 251, 256

[56] References Cited

U.S. PATENT DOCUMENTS

| | | | |
|---|---|---|---|
| 3,325,128 | 6/1967 | Elleboudt | 24/115 G |
| 3,346,688 | 10/1967 | Fields | 24/115 G |
| 4,288,891 | 9/1981 | Boden | 24/115 G |

FOREIGN PATENT DOCUMENTS 2009847 10/1967 France ............................ 174/40 R
771629 5/1977 Norway .

Primary Examiner—Paul J. Hirsch
Attorney, Agent, or Firm—Pearne, Gordon, Sessions, McCoy, Granger & Tilberry

[57] ABSTRACT

In connection with a device for tightening a rope, preferably an electric wire, it is suggested to use a base member (101) adapted to be attached to the support along which the wire (117) is to be stretched, resilient means (104a, 104b) which are carried or held by the base member (101) as well as a holding member (111) which can be displaced relative to the base member 101 under the influence of the resilient means (104a, 104b), and which is adapted for the rope or wire (117) to be attached thereto, the holding member (111) after the wire (117) has been attached to it, being displaceable from a preloaded installation position in which the wire is stretched and fixed to the holding member (111), to a wire tightening position, in which the holding means 111 via the resilient means (104a, 104b) transfer a tightening force to the wire (117).

10 Claims, 8 Drawing Figures

U.S. Patent  Apr. 24, 1984  Sheet 1 of 3  4,443,914
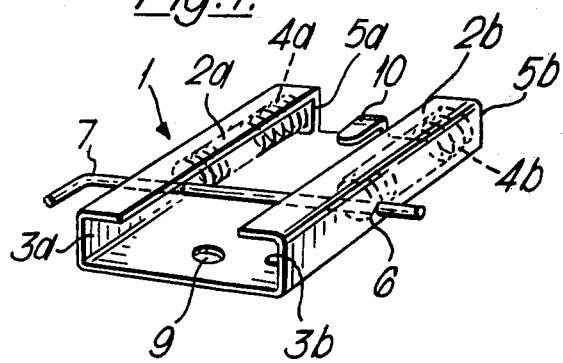
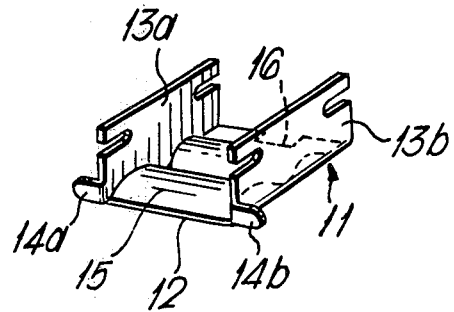
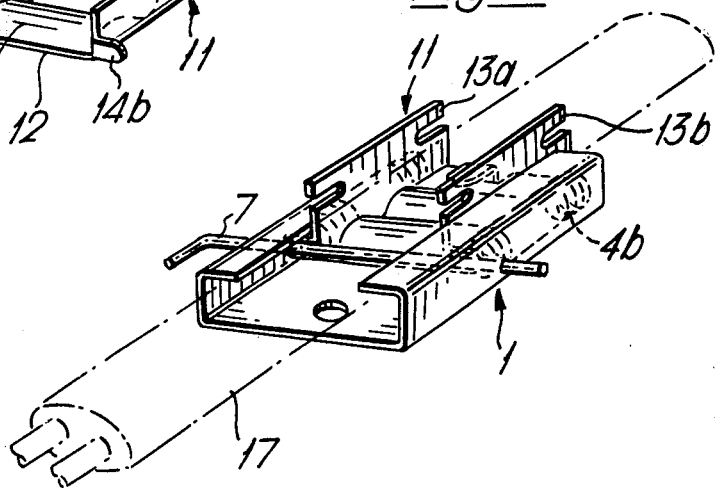
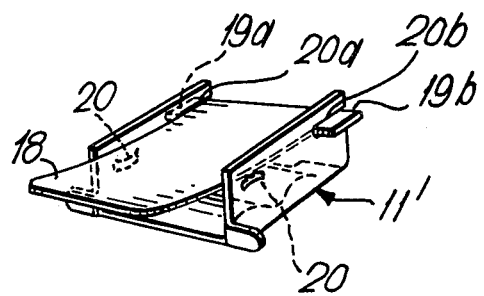

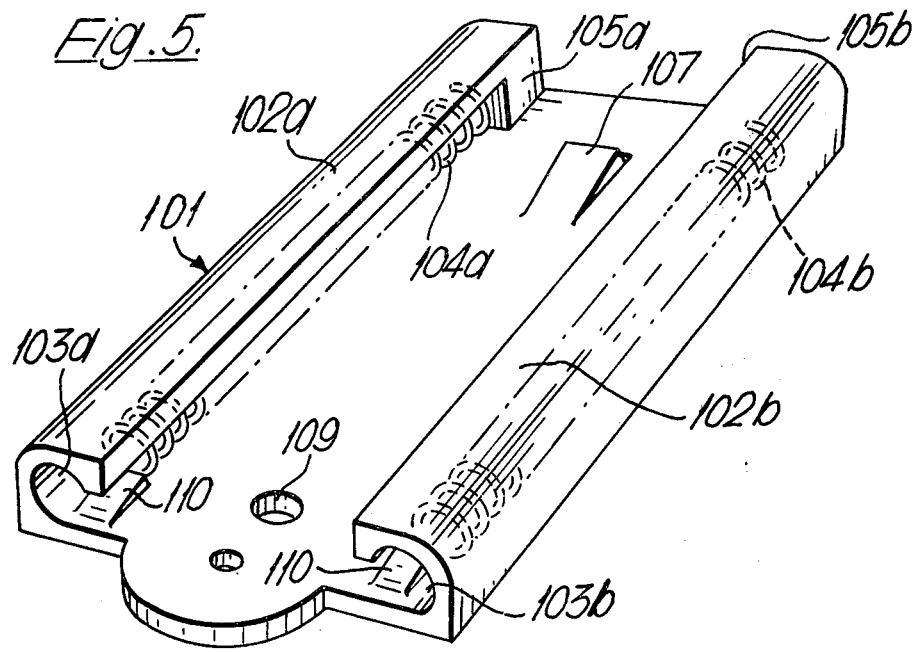
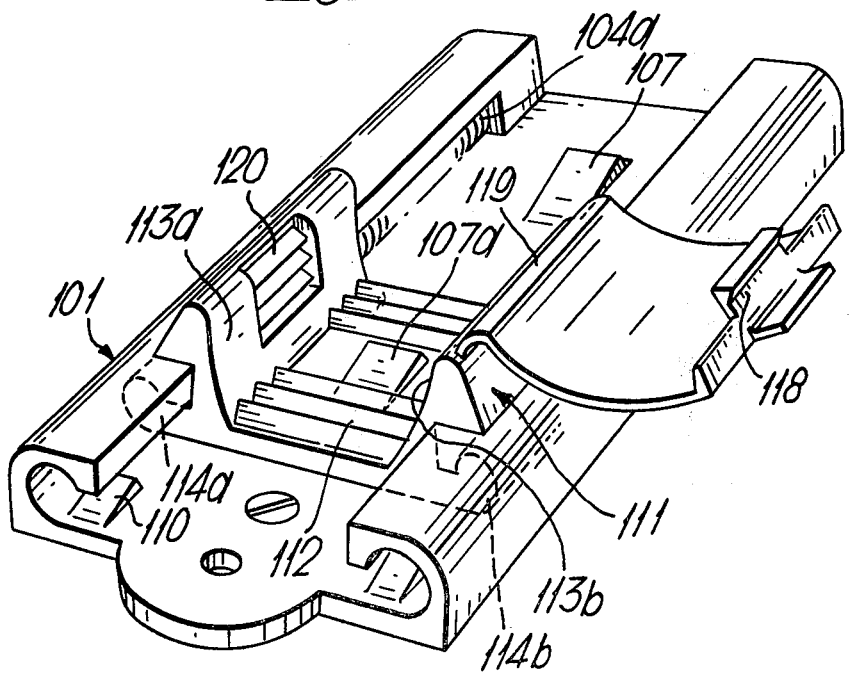

DEVICE FOR TIGHTENING A ROPE, PREFERABLY AN ELECTRIC WIRE

BACKGROUND OF THE INVENTION

The present invention relates to a device for tightening a rope, preferably an electric wire, for example an extension cord for electric apparatus or lamps, which is to be tightened along a wall or similar. More specifically the invention relates to that type of tightening device, which comprises a base member adapted to be attached to a support, a holding member adapted for the wire to be attached thereto and resilient means which in mounted condition of the devices exert a certain force between said members and thereby a tightening force on the wire.

DESCRIPTION OF THE PRIOR ART

In connection with the installation of electric articles, which are to be attached to a wall or to a ceiling, it is very often required to pass the supply-wire or -wires along a wall or a ceiling. To give the wire a tight and straight run for thereby exposing a neat appearance, it is often necessary with a series of attachment points along the wire run.

In connection with the attachment of electric supply- or extension cords there are previously known various types of holding clips of for example plastics, which are nailed to the support, the clips being provided with jaw- or groove-shaped portions which embrace the wire and hold it in place at the attachment point. However, such known fixing clips are suffering from the disadvantages that they do not give a satisfactory clamping effect arround the wires, and if the installed wire is subjected to pulling, it can easily be pulled out of its original stretched position and obtain disfiguring "bulges38 between the points of attachment.

There are further known devices of the type stated in the preamble (Norwegian patent application No. 77 1629), i.e. devices for tightening wires or cords including resilient means which exert a certain tightening force on the wire. However, such known devices suffer from the disadvantage that they comprise many and relatively complicated parts, such devices also being bulky and involving an installation procedure which easily can result in a too strong tightening of the wire.

SUMMARY OF THE INVENTION

An object of the present invention is to provide a device for tightening a rope or wire, in which the above mentioned problems are so to say eliminated.

Another object of the invention is to provide a device for tightening a rope or wire, which comprises few parts which are easy to install and which make it possible to establish a predetermined, favourable tightening force for the wire to be stretched along a larger surface.

These objects are achieved with a device which is of the type mentioned in the preamble, and which according to the invention is characterized in that the resilient means are carried or held by the base member, and that the holding member is displaceably arranged in the base member itself under the influence of the resilient means.

Preferably, the base member can further comprise a releaseable means serving to keep the holding member in a preloaded position against the resilient means, so that the holding member can transfer a tightening force to the wire when released from a first stationary position in which the wire is stretched and fixed in the holding member.

In a correct installation, in which the wire is stretched between a preceding fixing point by being attached in the preloaded holding member, the wire will after the release of the holding member from an installation position in which the wire is stretched and fixed to the base member, transfer a tightening force from the resilient members which are adapted to the type of wire which is to be installed.

The invention will in the following be further described, reference being had to the drawing which illustrates preferred embodiments of the invention.

BRIEF DESCRIPTION OF THE DRAWING

FIG. 1 is a schematic perspective view of an embodiment of a base member which is included in the device according to the present invention, and which is adapted to be attached to the support along which the wire is to be stretched.

FIG. 2 is a schematic perspective view of a holding member which is adapted to be displaced relative to the base member of FIG. 1 and for the attachment of the wire thereto.

FIG. 3 is a schematic perspective view, in which the holding member of FIG. 2 is inserted in the base member of FIG. 1 in a position ready for a wire or rope to be mounted therein.

FIG. 4 is a schematic perspective view of a second embodiment of the holding member equipped with a releaseable and pivotable locking means.

FIG. 5 is a schematic view of a second embodiment of a base member which is included in the device according to the invention, and which is adapted to be attached to the support along which the wire is to be stretched.

FIG. 6 is a schematic perspective view of a second embodiment of a holding member which is displaceably inserted in the base member of FIG. 5 in a position partly ready for receiving a rope or wire therein.

DESCRIPTION OF PREFERRED EMBODIMENTS

Figure 7:
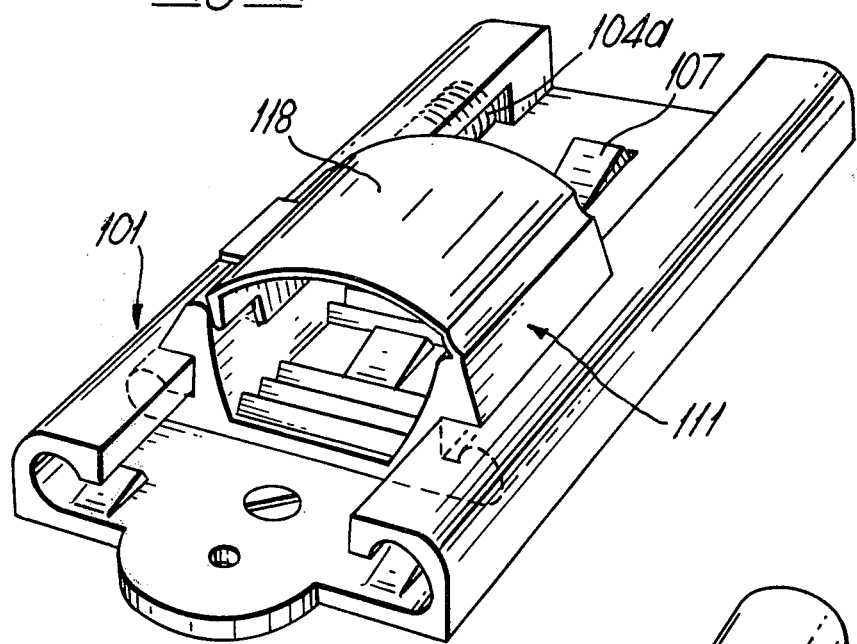
FIG. 7 is a schematic perspective view similar to FIG. 6, in which the releaseable and pivotable locking means on the holding member is shown in a closed position.

In FIG. 1 there is illustrated a base member 1, which is adapted to be attached to a support along which a wire or cord is to be stretched. The base member 1 is in the embodiment illustrated provided with a substantially C-shaped cross-section which along its side edges 2a and 2b, respectively, define partly open channels 3a and 3b, respectively, each of which holding a helical spring 4a and 4b, respectively.

At their first ends the channels 3a and 3b are open to facilitate the insertion of the helical springs, whereas at the opposite ends they are provided with end walls 5a and 5b, respectively, serving as abutment means for the helical springs 4a, 4b. In the channels of the base member there are provided two oppositely arranged holes of which only one 6 is illustrated in FIG. 1, and through the holes there is passed a pin 7, which in FIG. 1 is shown in a position in which the helical springs 4a, 4b are held in a prestressed position.

At its main surface the base member 1 is provided with a hole 9 serving for passing therethrough a screw for attaching the base member 1 to the support along which a wire or rope is to be stretched. However, it is to be understood that the hole 9 in some cases are superfluous as the base member 1, as an alternative, can be attached to a support by means of other attachment means, for example self-adhesive glue etc. Finally, the base member 1 is provided with a hook-shaped member 10 serving as an abutment means for a holding member which can be inserted and displaced in the area between the channels 2a, 2b against the force from the springs 4a, 4b, and which will be further discussed in the following.

In FIG. 2 there is illustrated a first embodiment of a holding member 11, having a substantially U-shaped cross-section, i.e. a web portion 12 merging into side portions 13a and 13b, respectively. Besides, the holding member 11 is provided with a buckled bottom plate 15 defining a support for the wire which is to be attached to the holding member, but it is to be understood that such a bottom plate 15 is not always necessary because the web portion 12 of the holding member can be provided with necessary friction promoting means, for example ribs or protrusions in the web portion itself.

At the end opposite to the abutment members 14a, 14b the holding member 11 is provided with a small notch 16 which allows the holding member 11 when this is inserted between the channels 2a, 2b of the base member, to be pushed somewhat beyond the hook-shaped member 10 of the base member 1.

In FIG. 3 the tightening device comprising the base member 1 and the holding member 11 is shown in a position ready for receiving the wire, i.e. with the holding member 11 being inserted in the base member 1 to a preloaded position against the springs 4a, 4b, in which it is held stationary by the pin 7 which prior to the insertion for the holding member was removed for later re-insertion.

In the assembled state of the device, such is illustrated in FIG. 3, the base member 1 can be attached to a support along which a wire 17 is to be stretched and tightened. The mounting takes place by initially attaching the base member 1 at a suitable point which renders a straight run of the wire 17 between one or more preceding points of attachment, the fixing of the base member taking place either by screwing, gluing or other methods of attachments. After the base member 1 has been attached to the support the wire 17 is clamped in the holding member 11, such a clamping taking place in a series of various manners.

For example the wire 17 can be fixed in the holding member 11 by bending the upper edges of the side portions 13a, 13b over the wire 17 which is placed in the holding member 11, such an attachment method making further parts superfluous, but in some instances being dependent on a simple tool.

After having fixed the wire 17 in the holding member 11 the pin 7 is removed from the base member 11, a fact which entails that the holding member 11 then will be released from its mounting position, in which the wire was stretched and fixed to the holding member, so as to transfer a tightening force from the springs 4a, 4b to the wire 17.

Depending on the characteristics of the springs and the location of the pin 7 it can, according to the various types of wires, be decided which value of the biasing force the holding member 11 should be subjected to, i.e. which tightening force the wire should be subjected to in the final installed position of the tightening device according to the invention.

In FIG. 4 there is illustrated a variant of the holding member 11' which is adapted to receive a preferably releasably arranged locking means 18. This is shaped as an elongated curved member which at the one end is provided with two side portions 19a, 19b, which are adapted to come into engagement with tracks 20a, 20b provided at the one end of side portions of the holding member 11'. Thus, the locking means 18 can be attached at the front edge of the holding member and can be pivoted about the point of attachment for clamping the wire and locking the same in a clamped position. The locking mechanism for the locking means 18 can be implemented in various manners, for example by means of inwardly protruding extensions 20, which retain the locking means 18 when this is pressed past the protrusion to a position with appropriate locking force.

Alternatively, the locking means 18 can be attached by means of a locking bit which can be displaced along the locking means whilst being guided in appropriate tracks, for example of the same type as the tracks 20a, 20b.

It is to be understood that a locking means for holding the wire in the holding member can be given various other shapes than what has been discussed above. For example the locking means can be a wedge-shaped member which can slide into suitable tracks in the holding member.

Further, there can be adapted to the U-shaped holding member a locking means which can be pressed down between the side portions of the holding member so as to be pressed against the wire and be retained by the side portions by means of snap action means.

In FIG. 5 there is illustrated a second embodiment of a base member 101 adapted to be attached to a support along which a wire is to be stretched. The base member 101 has a substantially C-shaped cross-section and has along its two side edges 102a and 102b partly open channels 103a and 103b, respectively, each of which holding a resilient member 104a and 104b, respectively.

The channels 103a and 103b are open at their first ends for facilitating the insertion of the resilient means which can be helical springs, whereas at the opposite ends the channels are provided with end walls 105a, 105b, defining abutment means for the springs 104a, 104b. In the bottom surface of the base member 101 there is provided a protruding means or a tongue 107, which fits into a corresponding track 107a (FIG. 6) in a holding member 111 (FIG. 6), and which serves as a releasable preloading means for the holding member 111.

In its main surface the base member 101 is provided with a hole 109 serving for the insertion of a screw for attachment of the base member 101 to a support along which a wire is to be stretched. However, it is to be understood that other attachment means, for example self-adhering glue etc. can be used for attaching the base member 101 to a support. The base member 101 is also provided with dog members 110 serving as abutment means for a holding member which is illustrated in FIG. 6, and which can be displaced in the area between the channels 102a, 102b against the force of the springs 104a, 104b.

In FIG. 6 which illustrates an appropriate second embodiment of a holding member according to the present invention, the holding member is designated by 111, the holding member also here having a substantially U-shaped cross-section, i.e. having a web portion 112 which merges into side portions 113a and 113b, respectively. Besides, the holding member 111 is along the edges provided with protruding portions 114a, 114b serving as abutment means for the above discussed helical springs 104a, 104b when the holding member 111 is put into position in the base member 101 whilst being guided in the channels 103a and 103b, the portions 114a, 114b being so adapted that they protrude into the area of said channels 103a, 103b.

Besides, the holding member 111 is provided with a buckled web portion 112 serving to provide a friction promoting support for the wire which is to be fixed in the holding member.

In FIG. 6 the device for tightening a rope or a wire and comprising the above discussed embodiments of a base member 101 and a holding member 111 is illustrated in a position partly ready for installation, i.e. with the holding member 111 displaced to a position in which it is partly preloaded against the force of the springs 104a, 104b. When being further displaced against the springs the holding member 111 can be retained in position by means of appropriate holding means, for example the tongue 107 on the base member 101 and the track 107a in the holding member 111. Possibly the holding member can rest against the dog members 110.

In the assembled position which is illustrated in FIG. 6, the base member 101 can be attached to the support along which a wire 117 (FIG. 8) is to be stretched. The assembly then takes place by initially attaching the base member 101 at a location which give a straight run of the wire 117 between one or more preceding attachment points, the attachment of the base member taking place either by screwing, gluing or other attachment procedures. After having attached the base member 101 to the support the wire 117 is clamped in the holding member 111, such a clamping taking place by means of a locking means 118, which is pivotably attached to the U-shaped holding member 111 by an attachment portion 119, and which can be pressed down between the side portions 113a, 113b of the holding member for pressing against the wire 117, the locking means 118 being retained by the side portions by snap action means as illustrated at 120 in FIG. 6.

Figure 8:
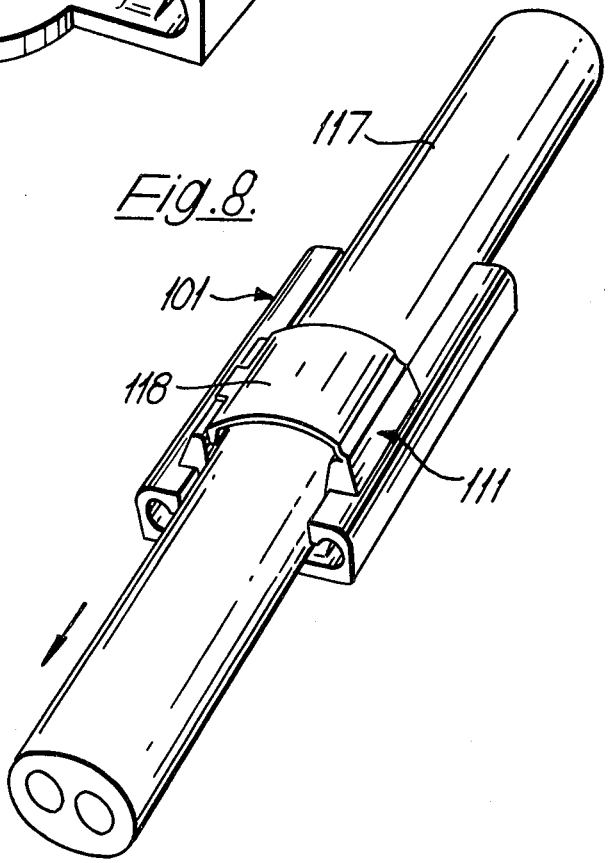
FIG. 8 illustrates the device according to FIGS. 5 to 7 in installed position including the stretched wire.

After the wire 117 has been clamped in the holding member 111 as this is illustrated in FIG. 7 and FIG. 8, the holding member 111 is released from its prestressed position in which the wire was stretched and locked to the base member, so that the holding member can take another position in which it transfers a tightening force from the springs 104a, 104b to the wire 117.

The release of the holding member 111 can take place at the same time as the the locking means 118 is pressed down, this pressing down action bringing the tongue 107 of the base member 101 out of engagement with the track 107a in the holding member 111.

It is to be understood that the above discussed base members and holding members can be implemented in several other ways than those disclosed above. For example, the base member can carry telescope-like resilient means which therein may hold springs or other implementations which can effect a resilient function. The base member must also in these cases give room for a holding member which can be displaced relative to the base member under the influence of the resilient members, and which serve for the fixing of the rope or wire, the holding member when being displaced from a first preloaded but stationary position in which the wire is stretched and attached to the base member, to a second "released" position being able to transfer a tightening force from the resilient means to the wire.

From the above description it should appear that several tightening devices can be used, one after the other.

What I claim is:

1. Device for tightening a rope, preferably an electric wire, along a support, comprising a base member (1; 101) adapted to be attached to the support, a holding member (11; 111) adapted for the wire (17; 117) to be attached thereto, and resilient means which in the installed condition of the device exerts a certain force between said members and thereby a tightening force on the wire, characterized in that the resilient means (4a, 4b; 104a, 104b) are carried or held by the base member (1; 101), and that the holding member (11; 111) is displaceably arranged in the base member (1; 101) itself so as to allow movement in relation thereto in the longitudinal direction of said wire under the influence of the resilient means.

2. Device as claimed in claim 1, characterized in that the base member (1; 101) further comprises a releaseable means (7; 107) serving to keep the holding member (11; 111) with the wire attached thereto in a preloaded position against the resilient means (4a, 4b; 104a, 104b), so that the holding member (11; 111) can transfer a tightening force to the wire (17; 117) when released from a first stationary position, in which the wire (17; 117) is stretched and fixed in the holding member (11; 111).

3. Device as claimed in claim 1, characterized in that the base member has a substantially C-shaped cross-section with side edges (2a, 2b; 102a, 102b) defining partly open channels (3a, 3b; 103a, 103b) holding said resilient means (4a, 4b; 104a, 104b) therein, in that between the channels the holding member (11; 111) is provided with a substantially U-shaped outwardly open configuration in which the wire (17; 117) can be placed for being attached thereto, and which defines abutment means for the resilient means.

4. Device as claimed in claim 2, characterized in that the releasable means comprises a first means provided on the base member and a second means provided on the holding member, said first and second means being adapted for releasable engagement with each other.

5. Device as claimed in claim 3, characterized in that the releasable means comprises a pin (7) adapted to be passed through two oppositely arranged holes (6) in the channels of the base member.

6. Device as claimed in claim 3, characterized in that the upper edges of the U-shaped holding member is adapted to be bent inwardly over a wire (17) which is placed in the holding member for being attached therein.

7. Device as claimed in claim 3, characterized in that to the U-shaped holding member (11) there is provided a possibly releasable locking means (18; 118), which can be swung about an attachment point for clamping the wire (17; 117) and locking in a wire clamping position.

8. Device as claimed in claim 3, characterized in that in the substantially U-shaped holding member there is provided a wedge-shaped locking means which can be slid into position between the side portions of the holding member for locking the wire therein.

9. Device as claimed in claim 7, characterized in that the locking means (18) at the end opposite the pivoting point (19a, 19b) is locked by protruding extensions (20)

operating between the locking means (18) and the holding member (11').

10. Device as claimed in claim 7, characterized in that the locking means (118) at the end opposite the pivoting point (119) is locked by adjustable snap action means (120) operating between the locking means (118) and the holding member (111).

* * * * *